United States Patent
Subramanian et al.

(10) Patent No.: US 11,772,624 B2
(45) Date of Patent: Oct. 3, 2023

(54) BRAKING ARRANGEMENT FOR A VEHICLE

(71) Applicant: VOLVO TRUCK CORPORATION, Gothenburg (SE)

(72) Inventors: Chidambaram Subramanian, Greensboro, NC (US); Abram McConnell Bradley, Colfax, NC (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 350 days.

(21) Appl. No.: 17/144,344

(22) Filed: Jan. 8, 2021

(65) Prior Publication Data

US 2022/0219662 A1     Jul. 14, 2022

(51) Int. Cl.
    B60T 13/68          (2006.01)
    B60T 13/66          (2006.01)
         (Continued)

(52) U.S. Cl.
    CPC .......... B60T 13/683 (2013.01); B60T 13/662 (2013.01); B60T 8/52 (2013.01); B60T 13/263 (2013.01); F16D 2066/005 (2013.01)

(58) Field of Classification Search
    CPC ........ B60T 13/683; B60T 8/52; B60T 13/662; B60T 7/20; B60T 13/24; B60T 8/26; B60T 17/06; B60T 13/263; B60T 2066/005
See application file for complete search history.

(56) References Cited

U.S. PATENT DOCUMENTS 3,740,104 A * 6/1973 Wolf .................... B60T 8/4095
                                                       303/116.3
4,792,194 A    12/1988 Hayashi et al.
(Continued)

FOREIGN PATENT DOCUMENTS

DE         19940529 A1     3/2001
EP          3511214 A1     7/2019
(Continued)

OTHER PUBLICATIONS

WO document No. 2013/093545 to Farres published on Jun. 27, 2013.*

(Continued)

*Primary Examiner* — Pamela Rodriguez
(74) *Attorney, Agent, or Firm* — WRB-IP PLLC

(57) ABSTRACT

A braking arrangement for a vehicle includes a source of pressurized air, a first wheel with a first pneumatic brake arrangement including a first brake, the first brake being arranged to be engaged when connected to the source of pressurized air and disengaged when disconnected from the source of pressurized air, a second wheel with a second pneumatic brake arrangement including a second brake, the second brake being arranged to be engaged when connected to the source of pressurized air and disengaged when disconnected from the source of pressurized air, and a proportional valve between the source of pressurized air and the first brake, opening of the proportional valve being proportional to pressure in a line between the source of pressurized air and the proportional valve. The first pneumatic brake arrangement and the second pneumatic brake arrangement function differently.

19 Claims, 9 Drawing Sheets

(51) Int. Cl.
  *B60T 8/52*   (2006.01)
  *B60T 13/26*  (2006.01)
  *F16D 66/00*  (2006.01)

(56) References Cited

U.S. PATENT DOCUMENTS

| | | |
|---|---|---|
| 4,836,616 A | 6/1989 | Roper et al. |
| 5,096,269 A | 3/1992 | Pickenhahn |
| 5,242,216 A | 9/1993 | Miyawaki et al. |
| 2015/0246666 A1 | 9/2015 | Sell |
| 2019/0047535 A1* | 2/2019 | Fulton .................... B60T 17/06 |
| 2019/0337502 A1* | 11/2019 | Farres ..................... B60T 7/20 |

FOREIGN PATENT DOCUMENTS

| | | |
|---|---|---|
| JP | 201539953 A | 3/2015 |
| WO | 2004020865 A1 | 3/2004 |

OTHER PUBLICATIONS

Translation of German Patent No. DE 19940529 obtained from website: https://worldwide.espacenet.com on Feb. 14, 2023.*
European Search Report (Jun. 23, 2022) for corresponding European App. 2126794.4.
Bendix® BP-R1™ Bobtail Proportioning Relay Valve, Service Data, (Jun. 2009).

* cited by examiner

BRAKING ARRANGEMENT FOR A VEHICLE

BACKGROUND AND SUMMARY

The present invention relates to a braking arrangement for a vehicle wherein brakes that function differently are provided on different axles of the vehicle.

In vehicles such as tandem axles trucks and tractors, it is sometimes desirable to provide one type of brake, such as drum brakes, on one axle, such as an auxiliary axle, and another type of brake, such as disc brakes, on another axle, such as a rear axle. This is usually done for cost reasons.

As the commercial vehicle industry has grown rapidly in advancing control systems and safety, vehicles have improved to travel faster and stop much quicker. There has been enormous growth in anti-lock brake system (ABS) technology. However, the market has not carried this technology growth uniformly in all axles. Usually for cost reasons, some vehicles are not provided with ABS on all axles, such as auxiliary axles, but are provided with ABS on other axles.

In the case of drum brakes versus disc brakes, there will tend to be a braking torque imbalance provided by the two brake types at the same brake demand. Drum brakes tend to provide more braking torque and do more work toward stopping a vehicle than disc brakes and will tend to wear much faster than disc brakes. FIG. 8 shows the shape of illustrative curves of braking torque provided versus braking demand for conventional drum brakes (curve Y) and disc brakes (curve C). Use of braking arrangements that function differently on different axles of a vehicle, such as drum brakes on an auxiliary axle and disc brakes on a rear axle, tends to cause several problems:

First, for a similar brake size, drum brakes have a higher brake factor than disc brakes due to their geometrical construction. This difference tends to be linear.

Second, drum brakes have a tendency to get self-energized during braking and stick more towards the brake shoe, thereby tending to provide an additional braking torque. In contrast, disc brakes behave opposite. In disc brakes, the piston in the caliper has a tendency to be pushed away from the rotor. The difference in brake torque between drum brakes and disc brakes due to self-energization tends to be non-linear.

Third, drum brakes tend to have poor heat dissipation compared to disc brakes. This phenomenon again leads to a non-linear difference between the coefficient of friction in the friction materials of the brake types. In addition, this introduces the uneven brake wear. It tends to be necessary to change drum brakes very often relative to disc brakes which is costly and requires maintenance during which the vehicle cannot be operated.

Yet another problem is that, as vehicles move faster, the need for them to have high braking forces so that they will be able to stop more quickly has grown has given rise to issues in connection with axles not provided with ABS. When high braking forces are provided, the wheels on axles without ABS tend lock up prematurely while the wheels on axles with ABS are brought to a stop in a more controlled fashion. The locking of the wheels on the axles without ABS tends to create a flat spot on the tires which wears out the tire rapidly and also creates tire pollution.

It is desirable to provide a braking arrangement in which the curves of braking torque versus braking demand for braking arrangements that function differently can be caused to have more similar shapes such that brake factor, tendency to self-energize, and heat dissipation for the different braking arrangements will be more similar, and brakes such as drum brakes will not tend to wear at a substantially different rate from brakes such as disc brakes on the same vehicle but different vehicle axles. It is also desirable to provide a braking arrangement in which the tendency for wearing of flat spots on and tire pollution due to tires on axles not being provided with ABS when other axles are provided with ABS can be overcome.

In accordance with an aspect of the present invention, a braking arrangement for a vehicle comprises a source of pressurized air, a first wheel with a first pneumatic brake arrangement including a first brake, the first brake being arranged to be engaged when connected to the source of pressurized air and disengaged when disconnected from the source of pressurized air, a second wheel with a second pneumatic brake arrangement including a second brake, the second brake being arranged to be engaged when connected to the source of pressurized air and disengaged when disconnected from the source of pressurized air, and a proportional valve between the source of pressurized air and the first brake, opening of the proportional valve being proportional to pressure in a line between the source of pressurized air and the proportional valve, wherein the first pneumatic brake arrangement and the second pneumatic brake arrangement function differently.

In accordance with another aspect of the present invention, a braking arrangement for a vehicle comprises a source of pressurized air, a first wheel with a first pneumatic brake arrangement including a first brake, the first brake being arranged to be engaged when connected to the source of pressurized air and disengaged when disconnected from the source of pressurized air, a proportional valve between the source of pressurized air and the first brake, opening of the proportional valve being proportional to pressure in a line between the source of pressurized air and the proportional valve, a second wheel with a second pneumatic brake arrangement including a second brake, the second brake being arranged to be engaged when connected to the source of pressurized air and disengaged when disconnected from the source of pressurized air, a first axle on which the first wheel is mounted, and a second axle on which the second wheel is mounted, wherein a curve of braking torque provided by the first brake versus braking demand is more similar in shape to a curve of braking torque provided by the second brake versus braking demand than those curves would be in the absence of the proportional valve.

In accordance with yet another aspect of the present invention, a braking arrangement for a vehicle comprises a source of pressurized air, a first wheel with a first pneumatic brake arrangement including a first brake, the first brake being arranged to be engaged when connected to the source of pressurized air and disengaged when disconnected from the source of pressurized air, a proportional valve between the source of pressurized air and the first brake, opening of the proportional valve being proportional to pressure in a line between the source of pressurized air and the proportional valve, a second source of pressurized air, a second proportional valve between the first proportional valve and the first brake, opening of the second proportional valve being proportional to pressure in a line between the second source of pressurized air and the second proportional valve, a second wheel with a second pneumatic brake arrangement including a second brake, the second brake being arranged to be engaged when connected to the source of pressurized air and disengaged when disconnected from the source of pressurized air, a first axle on which the first wheel is mounted, and a second axle on which the second wheel is mounted.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Embodiments of braking arrangements for a vehicle 21 are shown schematically in FIGS. 1-6. The vehicle 21 can be any type of vehicle, however, the present invention is believed to have particular application to vehicles such as trucks, tractors, and tractor-trailer combinations that use pneumatic brakes, such as disc brakes and/or drum brakes, for wheels on multiple axles and/or that provide anti-lock braking technology in connection with some but not all of the wheels on the vehicle's axles. The vehicle 21 illustrated in FIGS. 1-6 is a tractor-trailer combination comprising a tractor 23 and a trailer 25. Components that can be (but are not necessarily) identical in the various embodiments shown in FIGS. 1-6 are provided with the same reference numbers in the various figures. It will also be appreciated that the use of different reference numbers in the various figures does not necessarily mean that components in one figure are different from components in other figures.

In all of the embodiments shown in FIGS. 1-6, the braking arrangement includes a source of pressurized air 27 such as a reservoir or a compressor.

Figure 1:
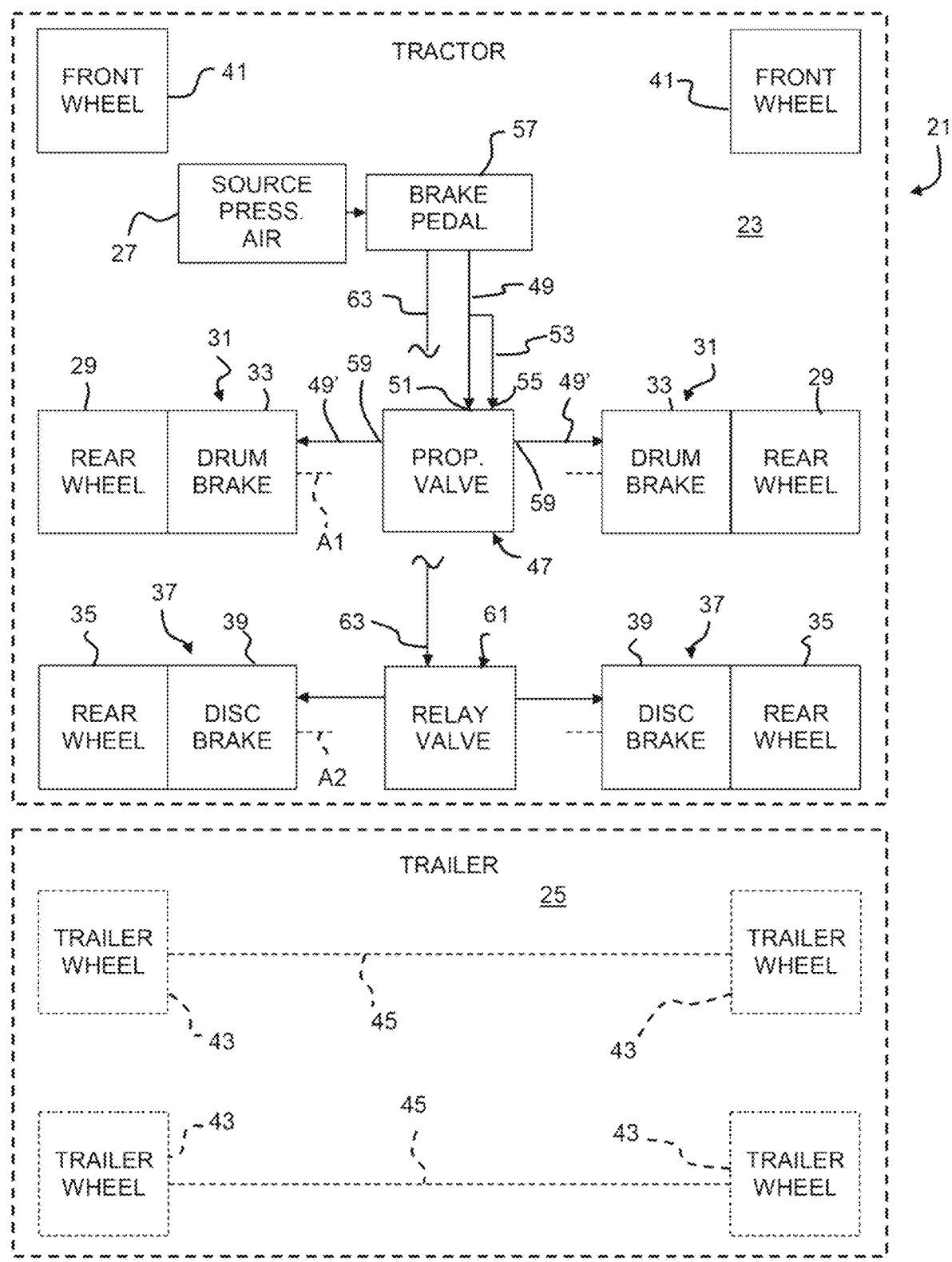
FIG. 1 is a schematic view of a vehicle including a braking arrangement according to a first embodiment of the present invention.

In the embodiment shown in FIG. 1, the braking arrangement further comprises a first wheel 29 on a first axle A1 with a first pneumatic brake arrangement 31 including a first brake 33. There are ordinarily two first brakes 33 (left and right) and at least two wheels 29 (left and right) on the first axle A1. As is common in truck and tractor braking systems, the first brake 33 is arranged to be engaged, i.e. deliver braking torque, when connected to the source of pressurized air 27 and disengaged when disconnected from the source of pressurized air.

The braking arrangement further comprises a second wheel 35 on a second axle A2 with a second pneumatic brake arrangement 37 including a second brake 39. Again, there are ordinarily two second brakes 39 (left and right) and at least two wheels 35 (left and right) on the second axle A2. The second brake 39 is also arranged to be engaged, i.e. deliver braking torque, when connected to the source of pressurized air 27 and disengaged when disconnected from the source of pressurized air. In a typical embodiment of a tractor having a tandem axle arrangement as shown, the first axle A1 will often be an auxiliary axle, and the second axle A2 will be a powered rear axle. The present invention is not, however, limited to such axle arrangements including an auxiliary axle and a powered rear axle, or to tandem axle vehicles.

Additional braking arrangements (not shown) may be provided for front wheels 41 and wheels 43 on other axles 45 (shown in phantom) such as axles on trailers 25.

In the embodiment shown in FIG. 1, a proportional valve 47 is provided between the source of pressurized air 27 and the first brake 33. Opening of the proportional valve 47 and, therefore, the extent to which the first brake 33 performs a braking function, is proportional to pressure in a line 49 between the source of pressurized air 27 and a supply port 51 of the proportional valve 47. A proportional valve that is well-suited for use as the proportional valve 47 is a Bendix BP-R1 Bobtail Proportioning Relay Valve, available from Bendix Commercial Vehicle Systems LLC, 901 Cleveland Street, Elyria, Ohio 44035. While the configuration of lines associated with the proportional valve 47 may vary depending upon the particular proportional valve used, in a presently preferred embodiment, a control line 53 is provided between the line 49 and a control port 55 in the proportional valve 47 so that pressure in the line 49 and, thus, the line 53, determines the extent to which the proportional valve 47 opens. The line 49 between the source of pressurized air 27 and the supply port 51 of the proportional valve 47 is part of a line including a line 49' between a delivery port 59 of the proportional valve and the first pneumatic brake arrangement 31.

A conventional brake pedal arrangement 57 that includes or is associated with a valve (not shown) in the line 49 is provided and opens or closes flow from the source of pressurized air 27 to the supply port 51 of the proportional valve 47 depending upon whether the valve is depressed or not. The extent to which a brake pedal (not shown) of the brake pedal arrangement 57 is depressed corresponds to braking demand and determines the extent to which the valve of the brake pedal arrangement opens and, consequently, the pressure in the line 49. Between minimal, usually zero, pressure in the line 49 when the brake pedal is not depressed and maximum pressure in the line equal to maximum pressure available from the source of pressurized air 27 when the brake pedal is fully depressed, there is ordinarily a substantially linear, direct relationship between the extent to which the brake pedal is depressed, the valve is opened, and the pressure in the line 49. When, for example, braking demand is minimal as when a user applies a light touch to the brake pedal, the valve of the brake pedal arrangement opens a small amount and pressure in the line 49 is relatively low. When braking demand is greater, as when the user applies more force to the brake pedal, the valve of the brake pedal arrangement opens more so that pressure in the line 49 increases and, as the valve of the brake pedal arrangement becomes fully open, pressure in the line 49 can approach or equal the pressure provided by the source of pressurized air 27.

Figure 7:
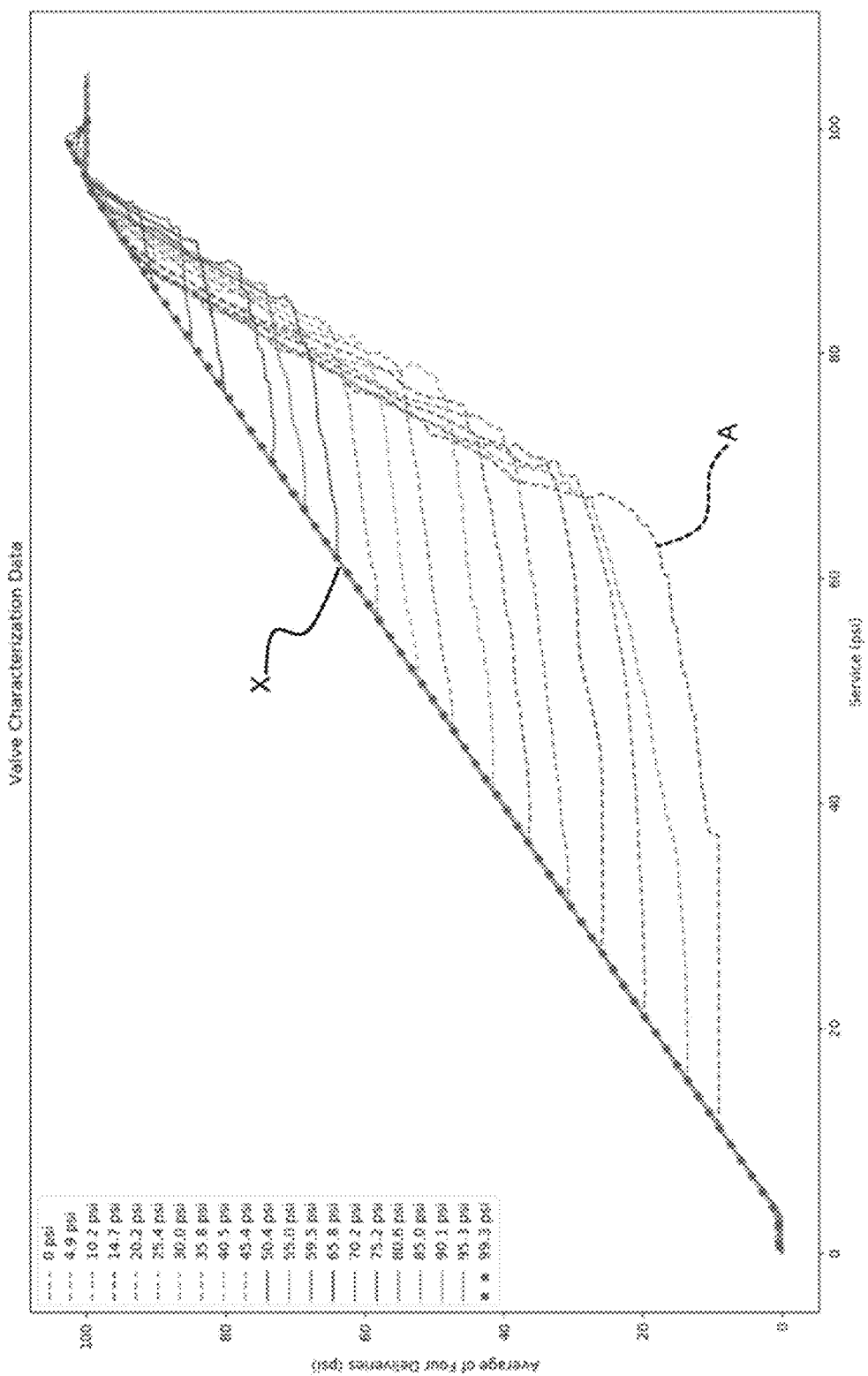
FIG. 7 is a graph showing how delivery pressure versus service pressure in a brake can be varied according to an aspect of the present invention.

If the proportional valve 47 were not present or were always completely open, the relationship between pressure supplied from the source of pressurized air 27 through the brake pedal arrangement 57 (i.e. the pressure arriving at the supply port 51 of the proportional valve) and pressure delivered to the first pneumatic brake arrangement 31 (i.e. the pressure delivered from a delivery port 59 of the proportional valve) will ordinarily be expected to be substantially linear, as shown by line X in FIG. 7. For certain types of brakes, such as drum brakes, if a proportional valve 47 is not present or is always completely open, the relationship between brake demand and brake torque applied may have a shape similar to that shown illustratively by line Y in FIG. 8, it being understood that the line Y is merely illustrative and that different brakes may have different brake demand and brake torque curves.

Ordinarily, the proportional valve 47 is closed, such as by an ordinarily closed proportioning piston (not shown) that is urged to a closed position by a structure such as a spring (not shown) when the brake pedal is not depressed and pressure in the line 53 is zero. When the brake pedal is depressed, the proportional valve 47 opens as pressure in the line 53 increases and overcomes the force of the structure, such as a spring, that urges the proportioning piston to the closed position.

The extent to which the proportional valve 47 opens depends upon the pressure in the line 49 and, thus, the line 53. By providing sufficient resistance to opening of the proportional valve 47, when there is relatively low pressure in the lines 49 and 53 the proportional valve will tend to remain mostly closed until pressure in the lines increases and the proportional valve opens more fully or completely. The relationship between pressure in the lines 49 and 53 and the extent to which such a proportional valve 47 opens is not linear but, rather, follows one of the curves A in FIG. 7. Thus, by providing such proportional valve 47 and control line 53 downstream of the brake pedal arrangement 57, pressure at the supply port 51 of the proportional valve 47 versus pressure in a line 49' between a delivery port 59 of the proportional valve and the first pneumatic brake arrangement 31 is not linear and, for a brake of the type where the brake torque corresponds to pressure in the line 49', the curve of brake torque versus brake demand will be nonlinear in a shape similar to that shown illustratively by curve B in FIG. 8.

A relay valve 61 is provided in a line 63 between the brake pedal arrangement 57 and the second pneumatic brake arrangement 37. The extent to which the brake pedal is depressed may be directly proportional to the pressure in the line 63 and, for purposes of discussion, will be assumed to be directly proportional to the pressure in the line 63. Depending upon the nature of the second pneumatic brake arrangement 37, the extent to which the brake pedal is depressed will ordinarily correspond to the extent to which the second brake 39 engages, although not necessarily in a linear manner. For certain types of brakes, such as disc brakes, the extent to which the second brake 39 engages, i.e. the brake torque delivered, as the result of increased pressure in the line 63 due to depression of the brake pedal, i.e. brake demand may have more of a curved shape as shown by curve C in FIG. 8.

According to an aspect of the invention, the first pneumatic brake arrangement 31 and the second pneumatic brake arrangement 37 function differently. For example, the first pneumatic brake arrangement 31 and the second pneumatic brake arrangement 37 may function differently in that the first brake 33 may be a drum brake and the second brake 39 may be a disc brake as shown in FIG. 1. Alternatively, as seen, for example, in FIG. 4, the first pneumatic brake arrangement 31' and the second pneumatic brake arrangement 37' may function differently in that a second brake 39' including an anti-lock braking system may be associated with the second pneumatic brake arrangement and not with the first brake 33' associated with the first pneumatic brake arrangement 31'. The particular types of first and second brakes 33' and 39' associated with the first pneumatic brake arrangement 31' and the second pneumatic brake arrangement 37' are not necessarily otherwise different. For example, the first and second brakes 33' and 39' may both be drum brakes or disc brakes, however, they may be different, such as by providing drum brakes for the first brakes 33' and disc brakes for the second brakes 39'.

Figure 8:
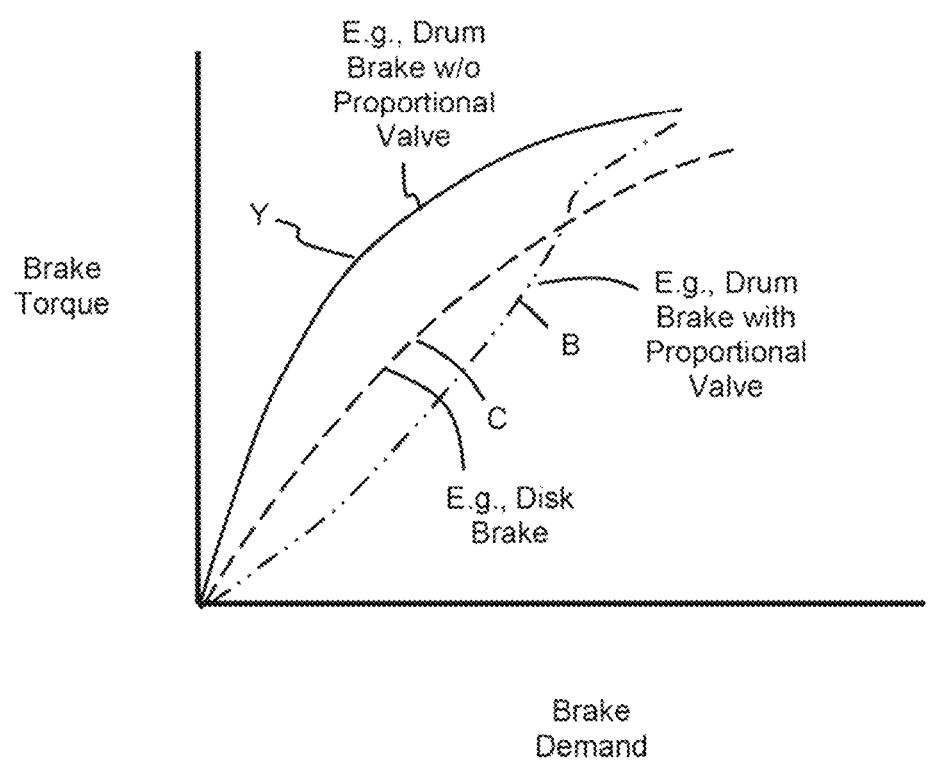
FIG. 8 is a graph showing how brake torque versus service brake demand can be varied according to an aspect of the present invention by providing a proportional valve associated with a brake.

By providing the proportional valve 47 in the line 49, 49' between the source of pressurized air 27 and the first pneumatic brake arrangement 31 as shown in FIG. 1, the shape of a brake torque versus brake demand curve of the first pneumatic brake arrangement 31 that would ordinarily be substantially linear in the fashion of curve Y in FIG. 8 can be caused to follow a curve C that approximates the shape of the brake torque versus brake demand curve B of the second pneumatic brake arrangement 37. In this way, torque imbalance and uneven brake wear that tends to occur when one type of brake, such as a drum brake, is provided on one vehicle axle and a different type of brake, such as a disc brake, is provided on another can be minimized.

Figure 4:
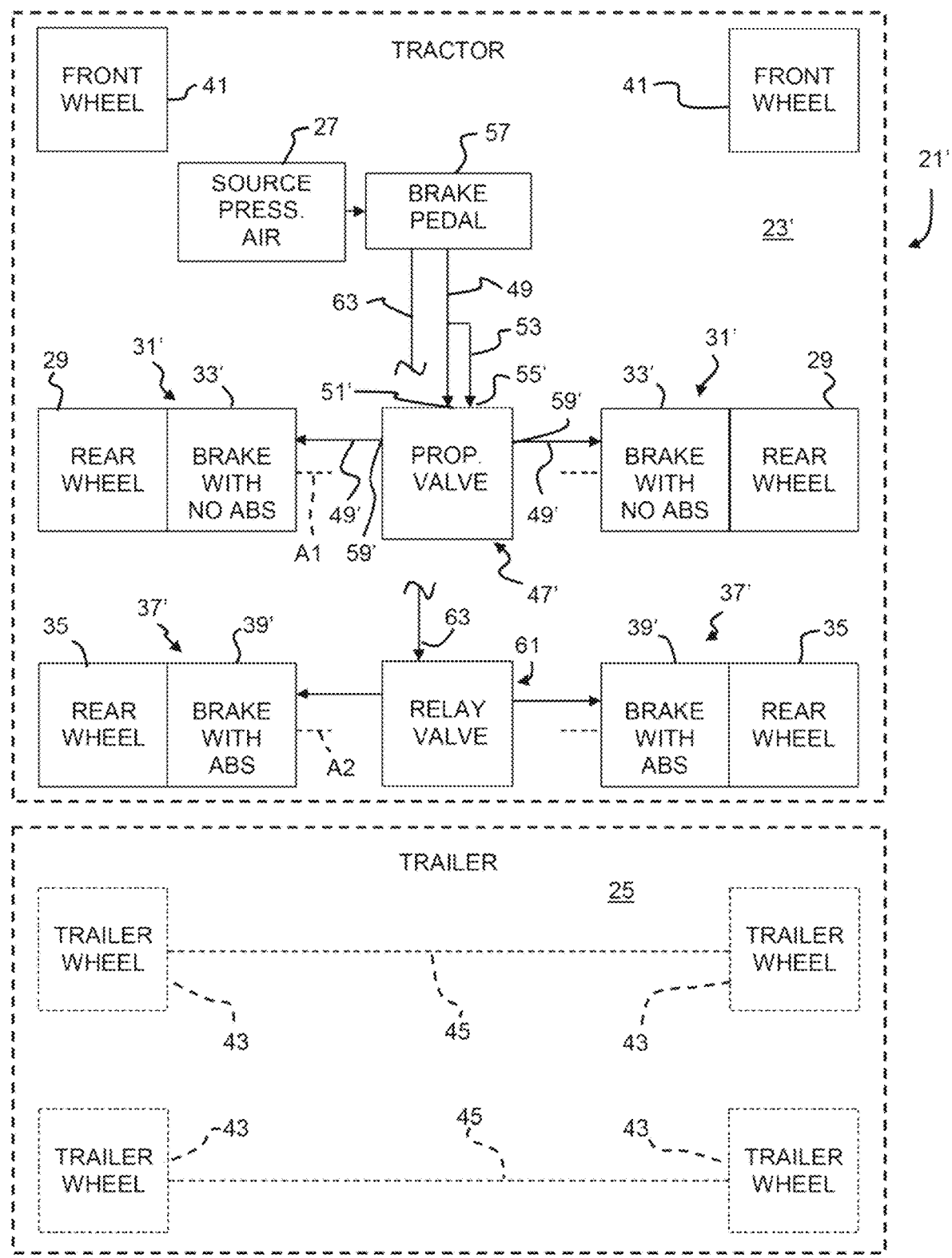
FIG. 4 is a schematic view of a vehicle including a braking arrangement according to a fourth embodiment of the present invention.

The vehicle 21' shown in FIG. 4 is identical to the vehicle 21 shown in FIG. 1 except that, in the first pneumatic brake arrangement 31' in the tractor 23' of the vehicle 21', the first brakes 33' are not provided with an anti-lock braking system (ABS) while the second brakes 39' of the second pneumatic brake arrangement 37' are provided with ABS. Other than the first brakes 33' not having ABS while the second brakes 39' have ABS, the first brakes may be the same type of brake as the second brakes (e.g., both drum brakes or both disc brakes) or may be different types of brakes (e.g., first brakes drum brakes and second brakes disc brakes).

Ordinarily, wheels with brakes that do not have ABS will tend to lock before wheels with brakes that do have ABS, which can tend to result in flat spots on the tires of the locked wheels. As in the vehicle 21 shown in FIG. 1, a line 49 extends between the source of pressurized air 27 and the supply port 51' of a proportional valve 47', and a control line 53 branches off the line 49 and leads to a control port 55' of the proportional valve. A line 49' extends from a delivery port 59' of the proportional valve 47' to the first pneumatic brake arrangement 31'. By providing the proportional valve 47' in the line 49, 49' between the source of pressurized air 27 and the first pneumatic brake arrangement 31' in the vehicle 21' as shown in FIG. 4 where the first brakes 33' are not provided with ABS will tend to reduce the tendency of those first brakes to lock and to more closely approximate the generally non-locking braking characteristics of the second brakes 39' of the second pneumatic brake arrangement 37' that are provided with ABS. This will, thus, tend to reduce flat spots on tires due to locking of the first brakes 29.

It will be appreciated that the first pneumatic brake arrangement and the second pneumatic brake arrangement may function differently in other ways than in the illustrative examples expressly described herein. With respect to all embodiments of the present invention, regardless however the first pneumatic brake arrangement and the second pneumatic brake arrangement might function differently, providing a proportional valve or proportional valves according to aspects of the present invention can facilitate causing the first and second pneumatic brake arrangements to behave more like each other and reduce or avoid torque imbalance and uneven brake wear and/or reduce or avoid the tendency of certain brakes to lock while others do not so that occurrence of flat spots on tires is reduced.

Figure 2:
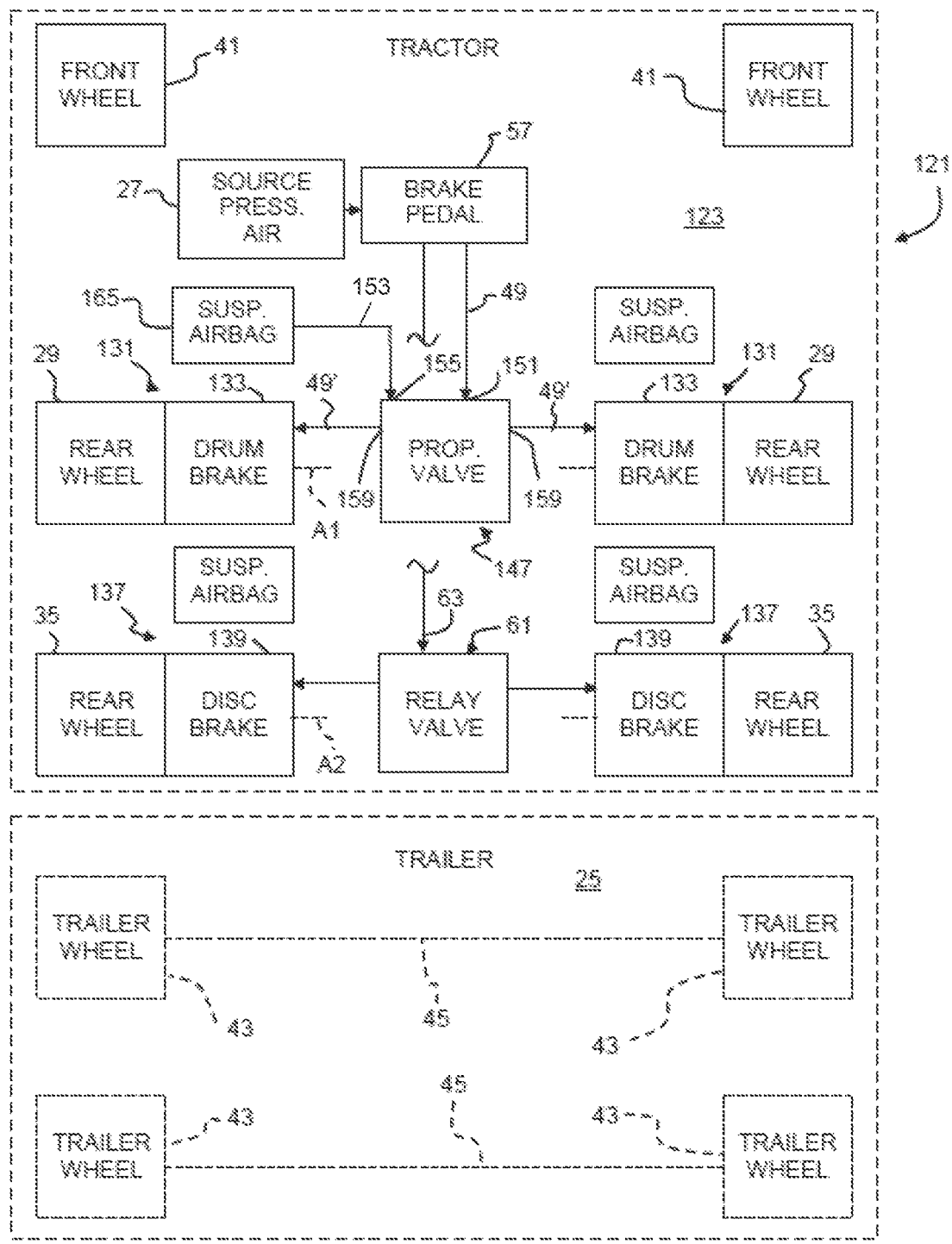
FIG. 2 is a schematic view of a vehicle including a braking arrangement according to a second embodiment of the present invention.
Figure 5:
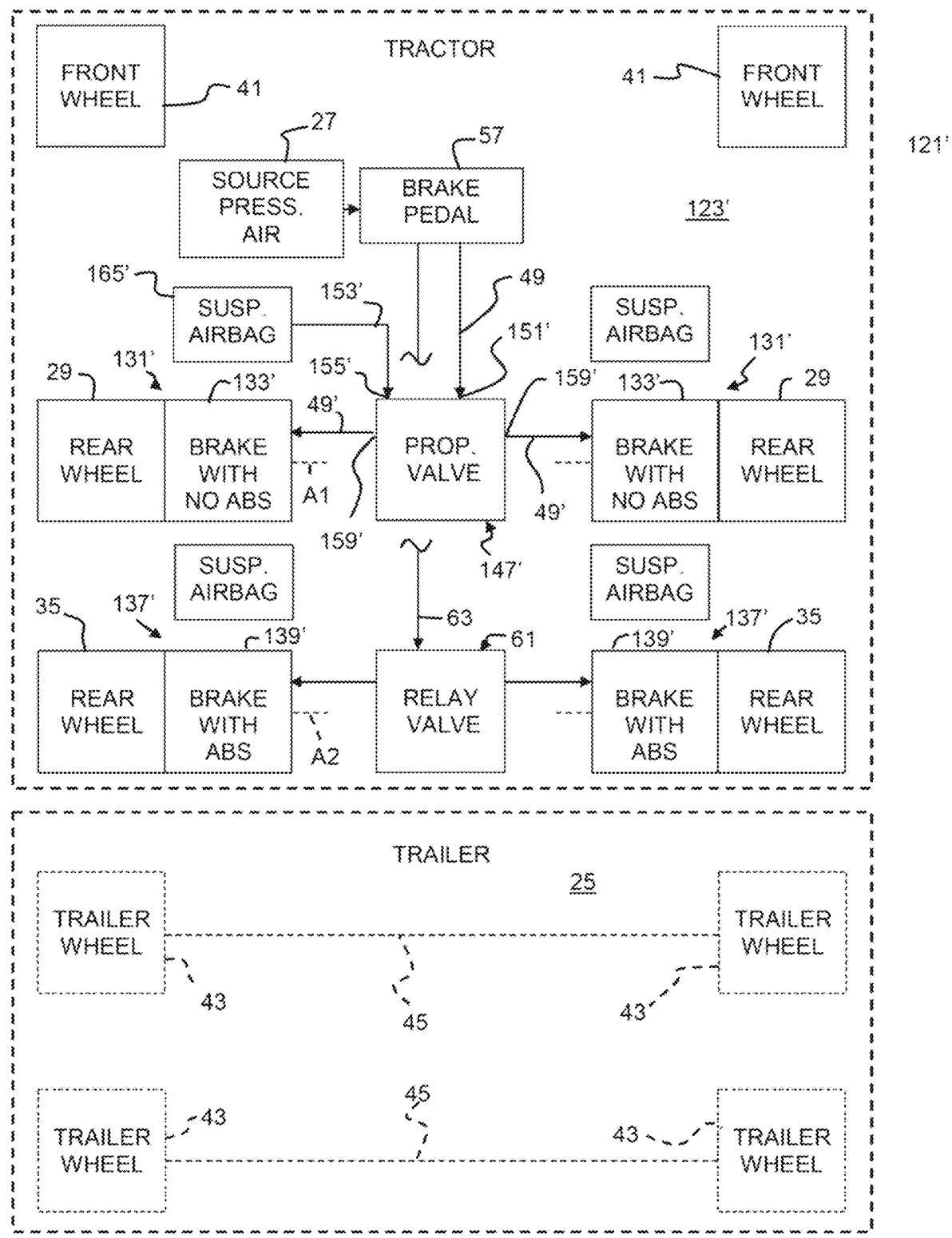
FIG. 5 is a schematic view of a vehicle including a braking arrangement according to a fifth embodiment of the present invention.

FIGS. 2 and 5 show vehicles 121, 121', respectively, with tractors 123, 123', respectively, similar to those shown in FIGS. 1 and 4 except that, instead of a proportional valve configured to alter the curves of brake torque versus brake demand in response to pressure in a control line that corresponds the extent to which an operator depresses a brake pedal, a proportional valve 147 (FIG. 2) or 147' (FIG. 5) is configured to alter the curves of brake torque versus brake demand in response to the extent to which the vehicle is loaded. With reference to FIG. 2 for purposes of discussion, a control line 153 connects a suspension airbag 165 to a control port 155 of the proportional valve 147. As in FIG. 1, a line 49 connects the source of pressurized air 27 to the supply port 151 of the proportional valve 147, and a line 49' connects the delivery port 159 of the proportional valve to the first pneumatic brake arrangement 131.

When the suspension airbag 165 is unloaded or at a minimal load such that there is no or minimal pressure in the line 153, the proportional valve 147 is closed, such as by an ordinarily closed proportioning piston (not shown) that is urged to a closed position by a structure such as a spring (not shown). When the load on the suspension airbag 165 is increased, the proportional valve 147 opens as the load and pressure in the line 153 increases and overcomes the force of the structure, such as a spring, that urges the proportioning piston to the closed position. The extent to which the proportional valve 147 opens depends upon the pressure in the suspension airbag 165 (which is a function of the load of the vehicle on the suspension airbag) and, thus, the line 153.

If the vehicle 121 is unloaded or lightly loaded and pressure in the suspension airbag 165 is relatively low, when an operator depresses the brake pedal of the brake pedal arrangement 157, the proportional valve 147 will be less open than at higher loads and the pressure in the line 149 between the source of pressurized air 127 and the proportional valve will be less than the pressure in the line 149' between the proportional valve and the first brake 133 of the first pneumatic brake arrangement 131 so that braking torque provided is less than would otherwise be provided without the proportional valve. At higher vehicle loads, as pressure in the suspension airbag 165 increases, the proportional valve 147 will open to a greater extent than at lower loads and the pressure in the line 49' between the proportional valve and the first brake 133 of the first pneumatic brake arrangement 131 will approach or equal the pressure in the line 49 between the source of pressurized air 27 and the proportional valve so that braking torque provided approaches or equals that which would otherwise be provided without the proportional valve.

Figure 9:
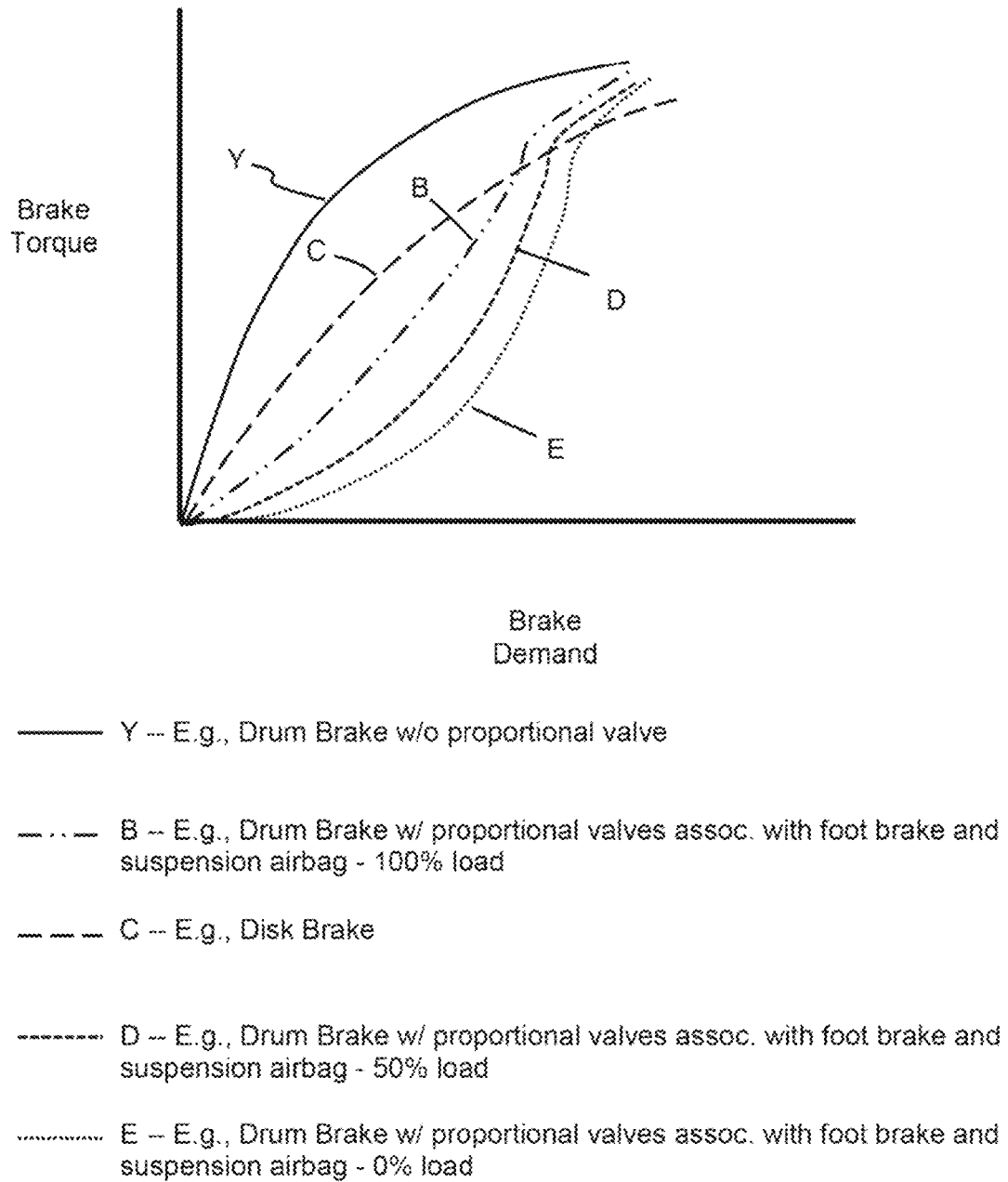
FIG. 9 is a graph showing how brake torque versus service brake demand can be varied according to an aspect of the present invention by providing a proportional valve associated with a brake and another proportional valve associated with a suspension airbag.

In FIG. 2, as in FIG. 1, the first brake 133 can be a brake such as a drum brake that, ordinarily (in the absence of any proportional valve), has a relationship between brake demand and brake torque that might follow a curve Y as shown in FIGS. 8 and 9, and the second brake 139 of the second pneumatic brake arrangement 137 can be a brake such as a disc brake that tends to have a relationship between brake demand and brake torque that might follow a curve such as curve C in FIGS. 8 and 9. By providing the proportional valve 147 between the line 49 between the source of pressurized air 27 and the proportional valve and the line 49' between the proportional valve and the first brake 133, at lower vehicle loads, the first brake will provide less brake torque in response to a particular brake demand than it otherwise would without the proportional valve while, at the same time, the second brake 139 will provide the brake torque that it ordinarily does in response to that brake demand. At full load, i.e. when the proportional valve 147 is open 100%, the first brake 133 will tend to have a brake torque versus brake demand curve the same as or similar to the curve Y. As load decreases, the curve will tend to be shallower, particularly when there is low brake demand. At high brake demand, it will ordinarily be desirable for the curve to approach the curve Y, even at low loads. When brake demand is lower, the shallower curve of brake torque versus brake demand of the brake 133 of the first pneumatic brake arrangement 131 can more closely approximate the brake torque versus brake demand provided curve C of the second pneumatic brake arrangement 137 and torque imbalance and uneven brake wear that tends to occur when one type of brake, such as a drum brake, is provided on one vehicle axle and a different type of brake, such as a disc brake, is provided on another can be minimized.

The vehicle 121' shown in FIG. 5 is identical to the vehicle 121 shown in FIG. 2 except that, in the first pneumatic brake arrangement 131' in the tractor 123' of the vehicle 121', the first brakes 133' are not provided with an anti-lock braking system (ABS) while the second brakes 139' of the second pneumatic brake arrangement 137' are provided with ABS. Other than the first brakes 133' not having ABS while the second brakes 139' of the second pneumatic brake arrangement 137' have ABS, the first brakes may be the same type of brake as the second brakes (e.g., both drum brakes or both disc brakes) or may be different types of brakes (e.g., first brakes drum brakes and second brakes disc brakes).

As in the vehicle 121 shown in FIG. 2, a line 49 extends between the source of pressurized air 27 and the supply port 151' of a proportional valve 147', and a control line 153' extends from a suspension airbag 165' and leads to a control port 155' of the proportional valve. A line 49' extends from a delivery port 159' of the proportional valve 147' to the first pneumatic brake arrangement 131'. Providing the proportional valve 147 in the line 49, 49' between the source of pressurized air 27 and the first pneumatic brake arrangement 131' in the vehicle 121' as shown in FIG. 5 where the first brakes 133' are not provided with ABS will tend to reduce the tendency of those first brakes to lock and approximate the generally non-locking braking characteristics of the second brakes 139' of the second pneumatic brake arrangement 137' that are provided with ABS and will, thus, tend to reduce flat spots on tires due to locking of the first brakes.

Figure 3:
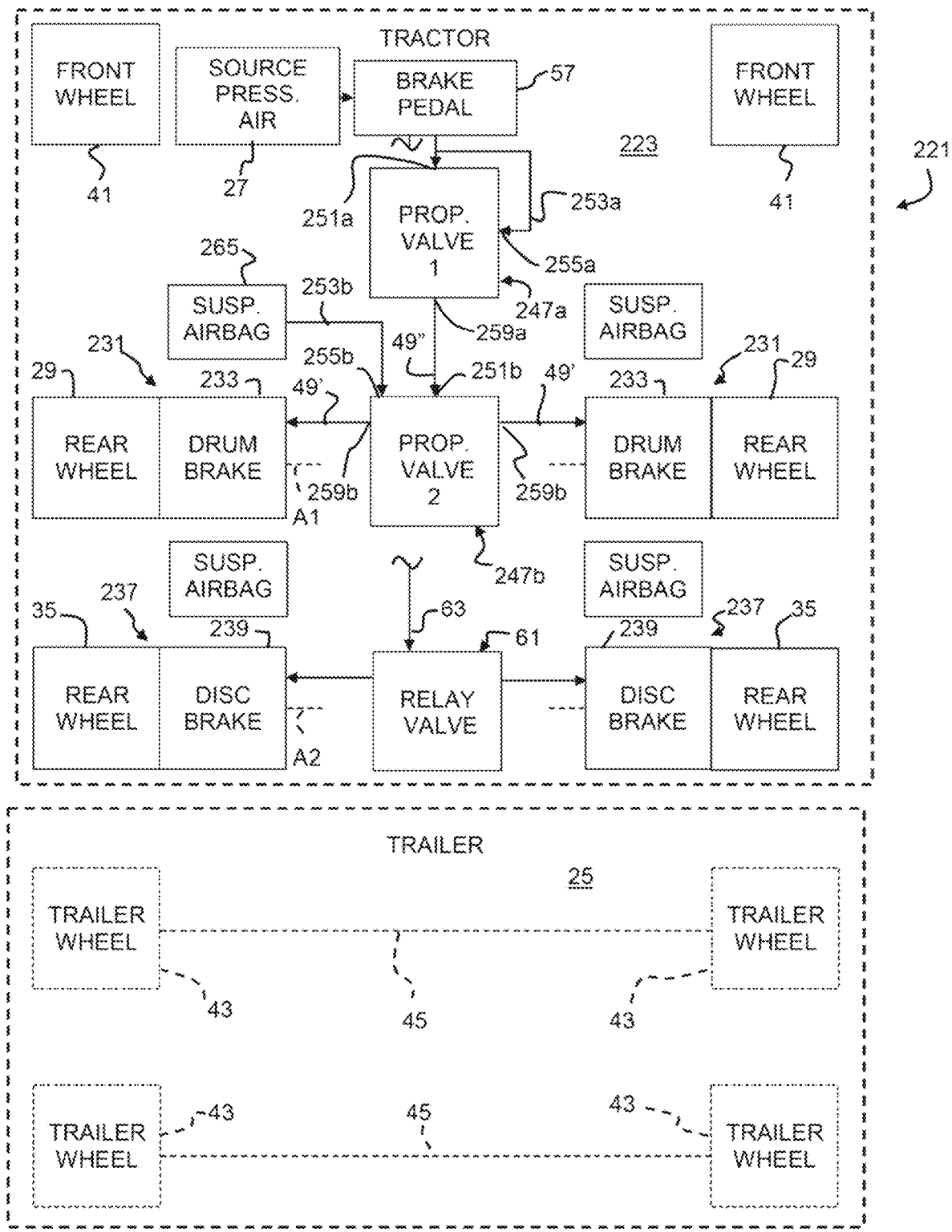
FIG. 3 is a schematic view of a vehicle including a braking arrangement according to a third embodiment of the present invention.
Figure 6:
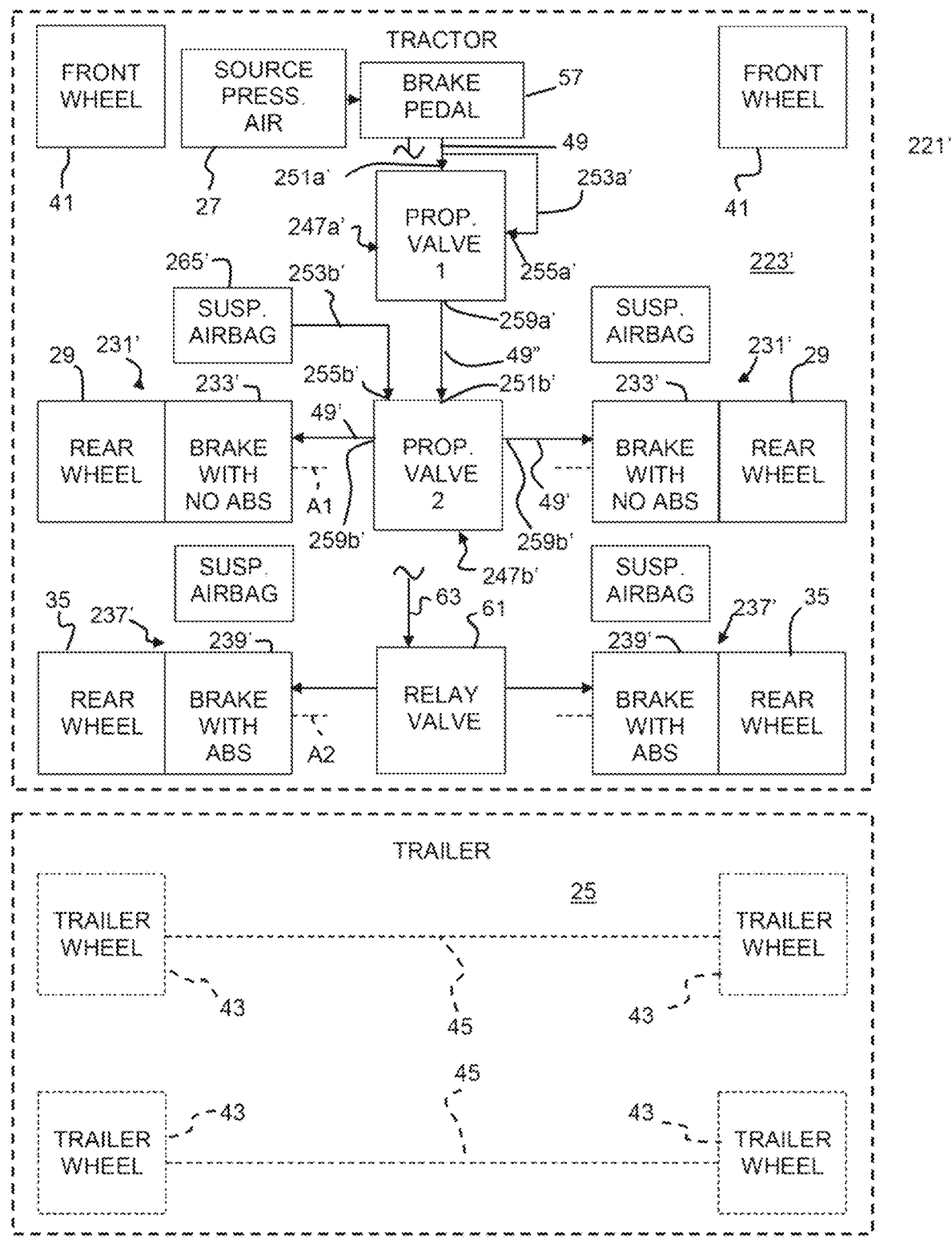
FIG. 6 is a schematic view of a vehicle including a braking arrangement according to a sixth embodiment of the present invention.

FIGS. 3 and 6 show vehicles 221, 221', respectively, with tractors 223, 223', respectively, similar to those shown in FIGS. 1 and 4 and FIGS. 2 and 5 except that, in addition to a proportional valve 247a (FIG. 3) and 247a' (FIG. 6) configured to alter the curves of brake torque versus brake demand in response to pressure in a control line that corresponds the extent to which an operator depresses a brake pedal as in FIGS. 1 and 4, a proportional valve 247b (FIG. 3) or 247b' (FIG. 6) is also provided in series with the proportional valves 247a and 247a' and is configured to alter the curves of brake torque versus brake demand in response to the extent to which the vehicle is loaded.

With reference to FIG. 3 for purposes of discussion, a control line 253a is provided between the line 49 and a control port 255a in the proportional valve 247a so that pressure in the line 49 and, thus, the line 253a, determines the extent to which the proportional valve 247a opens. The line 49 between the source of pressurized air 27 and the supply port 251a of the proportional valve 247a is part of a line including a line 49" between a delivery port 259a of the proportional valve 247a and a supply port 251b of the proportional valve 247b, and a line 49' between a delivery port 259b of the proportional valve 247b and the first pneumatic brake arrangement 231.

As in the embodiment of FIGS. 1 and 4, the pressure at the delivery port 259a of the proportional valve 247a will depend upon brake demand, usually the extent to which an operator depresses a brake pedal of the brake arrangement 57. In the vehicle 221 of FIG. 3, the first brakes 233 of the first pneumatic brake arrangement 231 can be brakes such as drum brakes that tend to have a higher brake factor than, a greater tendency to self-energize, and to dissipate heat less effectively than disc brakes, and the second brake arrangement 237 functions differently from the first brake arrangement, such as by including brakes such as disc brakes.

A control line 253b connects a suspension airbag 265 to a control port 255b of the proportional valve 247b. When there is no pressure in the suspension airbag 265 is unloaded or at a minimal load such that there is no or minimal pressure in the line 253b, the proportional valve 247b is closed or open to a minimal degree, such as by an ordinarily closed proportioning piston (not shown) that is urged to a closed position by a structure such as a spring (not shown). When the load on the suspension airbag 265 is increased, the proportional valve 247b opens as the load and pressure in the line 253 increases and overcomes the force of the structure, such as a spring, that urges the proportioning piston to the closed position. The extent to which the proportional valve 247b opens depends upon the pressure in the suspension airbag 265 (which is a function of the load of the vehicle on the suspension airbag) and, thus, the line 253. Thus, the pressure at the delivery port 259b of the proportional valve 247b will depend upon the load of the vehicle as well as upon the pressure delivered to the supply port 251b of the proportional valve 247b via the line 49" from the delivery port 259a of the proportional valve 247a, which depends upon brake demand, normally the extent to which an operator depresses the brake pedal of the brake arrangement 57. In this way, as in the illustrative graphs shown in FIG. 9, at full vehicle load, the proportional valve 247b can be assumed to be fully open and the brake torque versus brake demand provided curve B of the first pneumatic brake arrangement 231 can more closely approximate the brake torque versus brake demand provided curve C of the second pneumatic brake arrangement 237 and torque imbalance and uneven brake wear that tends to occur when one type of brake, such as a drum brake, is provided on one vehicle axle and a different type of brake, such as a disc brake, is provided on another can be minimized. At lower vehicle loads, the brake torque versus brake demand curves for the first pneumatic brake arrangement are shifted so that less braking torque is provided as braking demand decreases. For example, as seen in FIG. 9, at zero load (usually meaning that the pressure in the suspension airbags is due entirely to the weight of the vehicle), the brake torque versus brake demand curve E will be shallower at low brake demand than the brake torque versus brake demand curve D when the vehicle is at 50% of maximum load, and shallower still at low brake demand than the brake torque versus brake demand curve B for the vehicle at 100% of maximum load. As brake demand increases, braking torque will ordinarily increase toward a maximum braking torque available through the first brake arrangement.

The vehicle 221' shown in FIG. 6 is identical to the vehicle 221 shown in FIG. 3 except that, in the first pneumatic brake arrangement 231' in the tractor 223' of the vehicle 221', the first brakes 233' are not provided with an anti-lock braking system (ABS) while the second brakes 239' of the second pneumatic brake arrangement 237' are provided with ABS. Other than the first brakes 233' not having ABS while the second brakes 239' of the second pneumatic brake arrangement 237' have ABS, the first brakes may be the same type of brake as the second brakes (e.g., both drum brakes or both disc brakes) or may be different types of brakes (e.g., first brakes drum brakes and second brakes disc brakes). As in the vehicle 221 shown in FIG. 3, a line 49 extends between the source of pressurized air 27 and the supply port 251a' of a first proportional valve 247a', and a control line 253a branches off the line 49 and leads to a control port 255a' of the first proportional valve. A line 49" extends from a delivery port 259a' of the first proportional valve 247a' to the supply port 251b' of a second proportional valve 251b', a control line 253b' extends from a suspension airbag 265' to a control port 255b' of the second proportional valve, and a line 49' extends from the delivery port 259b' of the second proportional valve to the first pneumatic brake arrangement 231'. Providing the proportional valves 247a', 247b' in the line 49, 49', 49" between the source of pressurized air 27 and the first pneumatic brake arrangement 231' in the vehicle 221' as shown in FIG. 6 where the first brakes 233' are not provided with ABS will tend to reduce the tendency of those first brakes to lock and can more closely approximate the generally non-locking braking characteristics of the second brakes 239' of the second pneumatic brake arrangement 237' that are provided with ABS and will, thus, tend to reduce flat spots on tires due to locking of the first brakes.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A braking arrangement for a vehicle, comprising:
   a source of pressurized air;
   a first wheel with a first pneumatic brake arrangement including a first brake, the first brake being arranged to be engaged when connected to the source of pressurized air and disengaged when disconnected from the source of pressurized air;
   a second wheel with a second pneumatic brake arrangement including a second brake, the second brake being arranged to be engaged when connected to the source of pressurized air and disengaged when disconnected from the source of pressurized air; and
   a proportional valve between the source of pressurized air and the first brake, opening of the proportional valve being proportional to pressure in a line between the source of pressurized air and the proportional valve,
wherein the first pneumatic brake arrangement and the second pneumatic brake arrangement are different brake types.

2. The braking arrangement for a vehicle as set forth in claim 1, wherein the source of pressurized air comprises a compressor, the braking arrangement for a vehicle comprising a brake pedal arrangement configured to adjust flow communication between the source of pressurized air and the first brake by closing flow communication between the source of pressurized air and the first brake when a brake pedal of the brake pedal arrangement is released and opening flow communication between the source of pressurized air and the first brake and increase pressure in the line in a relationship to an extent to which the brake pedal is depressed.

3. The braking arrangement for a vehicle as set forth in claim 2, comprising a second proportional valve between the first proportional valve and the first brake, and a second source of pressurized air, opening of the second proportional valve being proportional to pressure in a line between the second source of pressurized air and the second proportional valve.

4. The braking arrangement for a vehicle as set forth in claim 3, wherein the second source of pressurized air comprises a suspension airbag of the vehicle.

5. The braking arrangement for a vehicle as set forth in claim 3, wherein pressure provided by the second source of pressurized air corresponds to a weight of the vehicle.

6. The braking arrangement for a vehicle as set forth in claim 1, wherein the source of pressurized air comprises a suspension airbag of the vehicle.

7. The braking arrangement for a vehicle as set forth in claim 1, wherein the first brake is a drum brake and the second brake is a disc brake.

8. The braking arrangement for a vehicle as set forth in claim 1, comprising an anti-lock braking system associated with the second brake arrangement and not the first brake arrangement.

9. A braking arrangement for a vehicle, comprising:
a source of pressurized air;
a first wheel with a first pneumatic brake arrangement including a first brake, the first brake being arranged to be engaged when connected to the source of pressurized air and disengaged when disconnected from the source of pressurized air;
a proportional valve between the source of pressurized air and the first brake, opening of the proportional valve being proportional to pressure in a line between the source of pressurized air and the proportional valve;
a second wheel with a second pneumatic brake arrangement including a second brake, the second brake being arranged to be engaged when connected to the source of pressurized air and disengaged when disconnected from the source of pressurized air;
a first axle on which the first wheel is mounted; and
a second axle on which the second wheel is mounted,
wherein a curve of braking torque provided by the first brake versus braking demand is more similar in shape to a curve of braking torque provided by the second brake versus braking demand than those curves would be in the absence of the proportional valve.

10. The braking arrangement for a vehicle as set forth in claim 9, wherein the first brake is a drum brake and the second brake is a disc brake.

11. The braking arrangement for a vehicle as set forth in claim 9, comprising an anti-lock braking system associated with the second brake arrangement and not the first brake arrangement.

12. The braking arrangement for a vehicle as set forth in claim 9, wherein the source of pressurized air comprises a compressor, the braking arrangement for a vehicle comprising a brake pedal arrangement configured to adjust flow communication between the source of pressurized air and the first brake by closing flow communication between the source of pressurized air and the first brake and the second brake when a brake pedal of the brake pedal arrangement is released and opening flow communication between the source of pressurized air and the first brake and the second brake and increase pressure in the line in a relationship to an extent to which the brake pedal is depressed.

13. The braking arrangement for a vehicle as set forth in claim 12, comprising a second proportional valve between the first proportional valve and the first brake, and a second source of pressurized air, opening of the second proportional valve being proportional to pressure in a line between the second source of pressurized air and the second proportional valve.

14. The braking arrangement for a vehicle as set forth in claim 13, wherein the second source of pressurized air comprises a suspension airbag of the vehicle.

15. The braking arrangement for a vehicle as set forth in claim 13, wherein pressure provided by the second source of pressurized air corresponds to a weight of the vehicle.

16. The braking arrangement for a vehicle as set forth in claim 9, wherein the source of pressurized air comprises a suspension airbag of the vehicle.

17. A braking arrangement for a vehicle, comprising:
a source of pressurized air;
a first wheel with a first pneumatic brake arrangement including a first brake, the first brake being arranged to be engaged when connected to the source of pressurized air and disengaged when disconnected from the source of pressurized air;
a proportional valve between the source of pressurized air and the first brake, opening of the proportional valve being proportional to pressure in a line between the source of pressurized air and the proportional valve;
a second source of pressurized air;
a second proportional valve between the first proportional valve and the first brake, opening of the second proportional valve being proportional to pressure in a line between the second source of pressurized air and the second proportional valve;
a second wheel with a second pneumatic brake arrangement including a second brake, the second brake being arranged to be engaged when connected to the source of pressurized air and disengaged when disconnected from the source of pressurized air;
a first axle on which the first wheel is mounted; and
a second axle on which the second wheel is mounted.

18. The braking arrangement for a vehicle as set forth in claim 17, wherein the first brake is a drum brake and the second brake is a disc brake.

19. The braking arrangement for a vehicle as set forth in claim 17, comprising an anti-lock braking system associated with the second brake arrangement and not the first brake arrangement.

* * * * *